/ 73-656
10/23/79    XR    4,171,914

United States Patent [19]
Newman

[11] 4,171,914
[45] Oct. 23, 1979

[54] HOLOGRAM APPARATUS FOR TESTING WELDS

[75] Inventor: John W. Newman, Wayne, Pa.

[73] Assignee: Laser Technology, Inc., Norristown, Pa.

[21] Appl. No.: 872,919

[22] Filed: Jan. 27, 1978

[51] Int. Cl.² .............................................. G01B 9/02
[52] U.S. Cl. .................................... 356/348; 73/656
[58] Field of Search ........................... 356/347, 348; 350/3.75–3.79; 73/655, 656

[56] References Cited
U.S. PATENT DOCUMENTS

| | | | |
|---|---|---|---|
| 3,532,407 | 10/1970 | Upatnieks | 350/3.69 |
| 3,631,713 | 1/1972 | Marom | 73/577 |
| 3,644,047 | 2/1972 | Brown et al. | 356/348 |
| 3,681,970 | 8/1972 | Wells | 73/15 FD |
| 3,690,159 | 9/1972 | Kersch et al. | 356/347 |
| 3,711,202 | 1/1973 | Rush et al. | 356/348 |
| 3,837,726 | 9/1974 | Suzuki et al. | 356/347 |
| 3,897,995 | 8/1975 | Penn | 356/347 |
| 3,911,733 | 10/1975 | Bhuta et al. | 356/347 |
| 3,976,380 | 8/1976 | Rottenkolber | 356/347 |

*Primary Examiner*—Conrad J. Clark
*Attorney, Agent, or Firm*—Harding, Earley & Follmer

[57] ABSTRACT

Hologram apparatus for testing for defects in welds has a frame with means for supporting the frame. A laser beam is directed towards one end of the frame where it is reflected by a rotatable mirror onto an area of the weld lying in a predetermined direction within an arc of about 90° extending from a point directly below the mirror. A head is mounted for rotation on said one end of the frame coaxially with the mirror. A photosensitive recording medium is mounted on the head for receiving laser light reflected from said weld. A reference beam mirror is mounted on the head for reflecting laser light from the rotatable mirror to the recording medium as a reference beam. The rotatable mirror and the head are interconnected to cause the ratio of the angular movement of the head to the angular movement of the rotatable mirror to be two to one.

8 Claims, 12 Drawing Figures

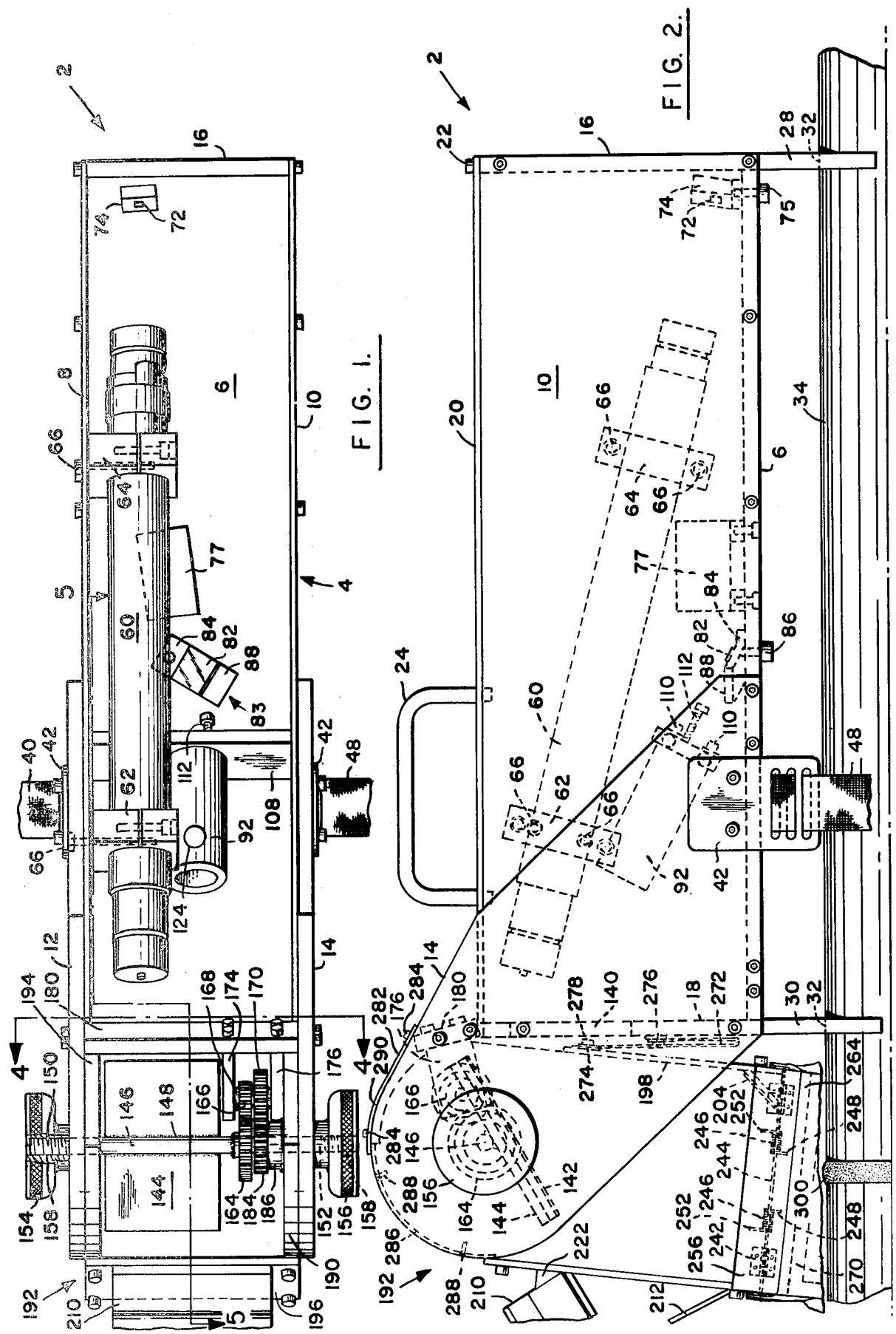

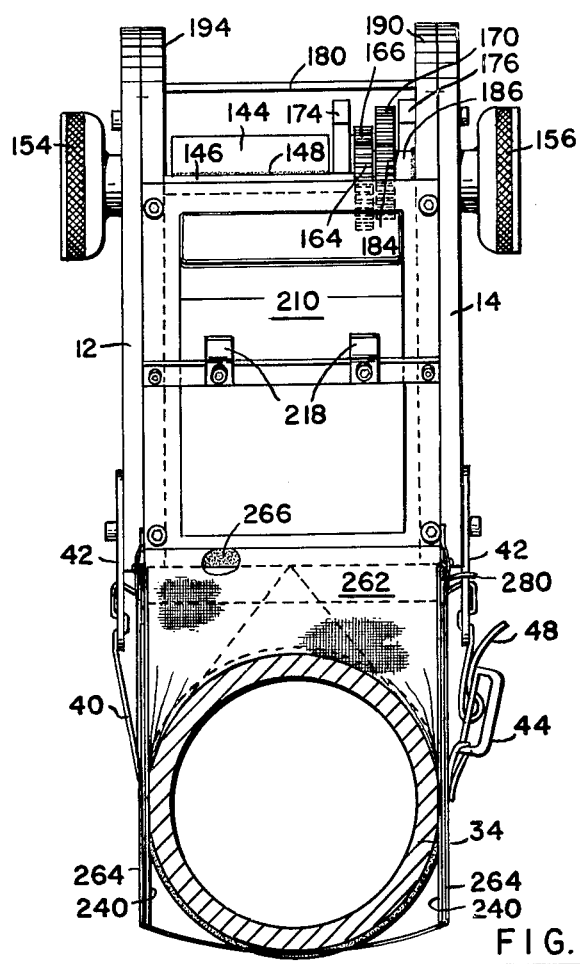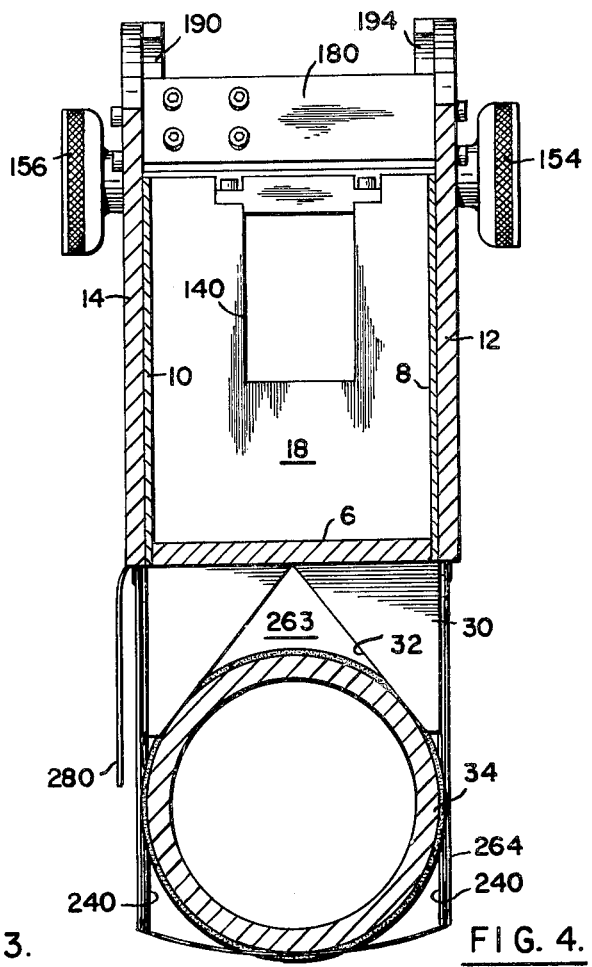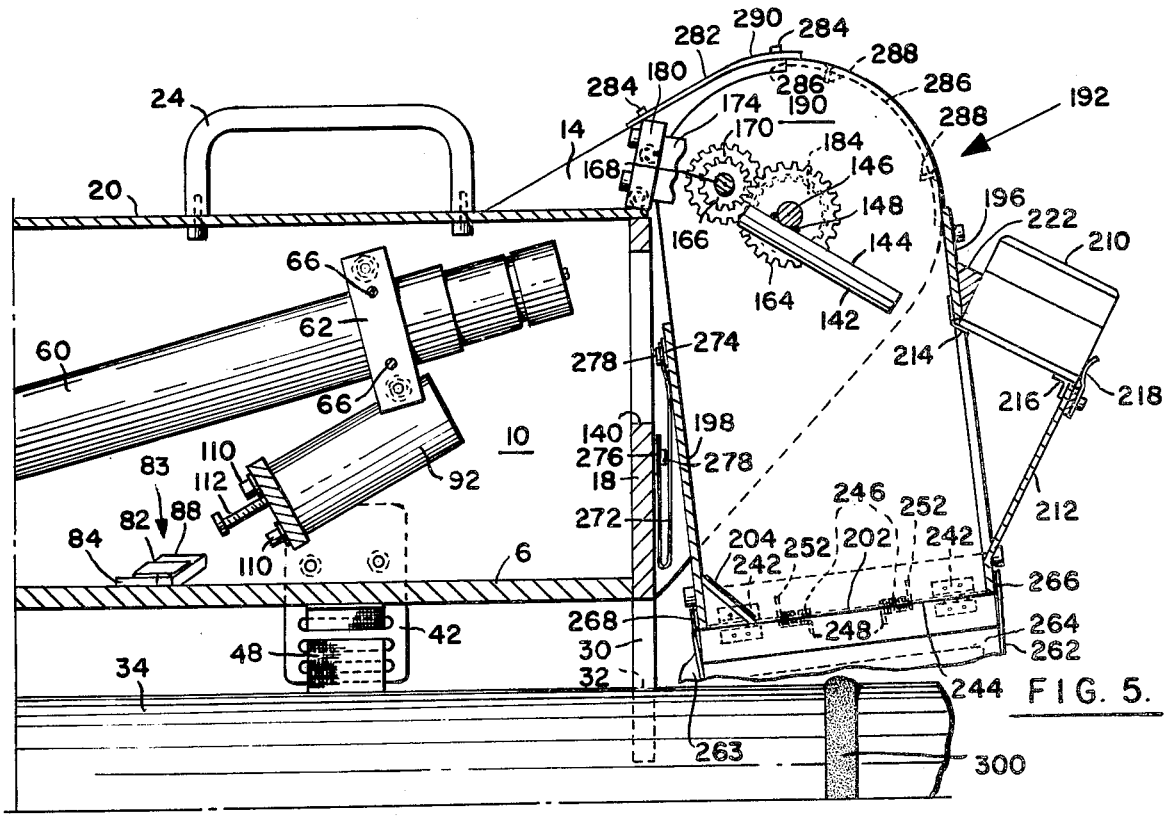

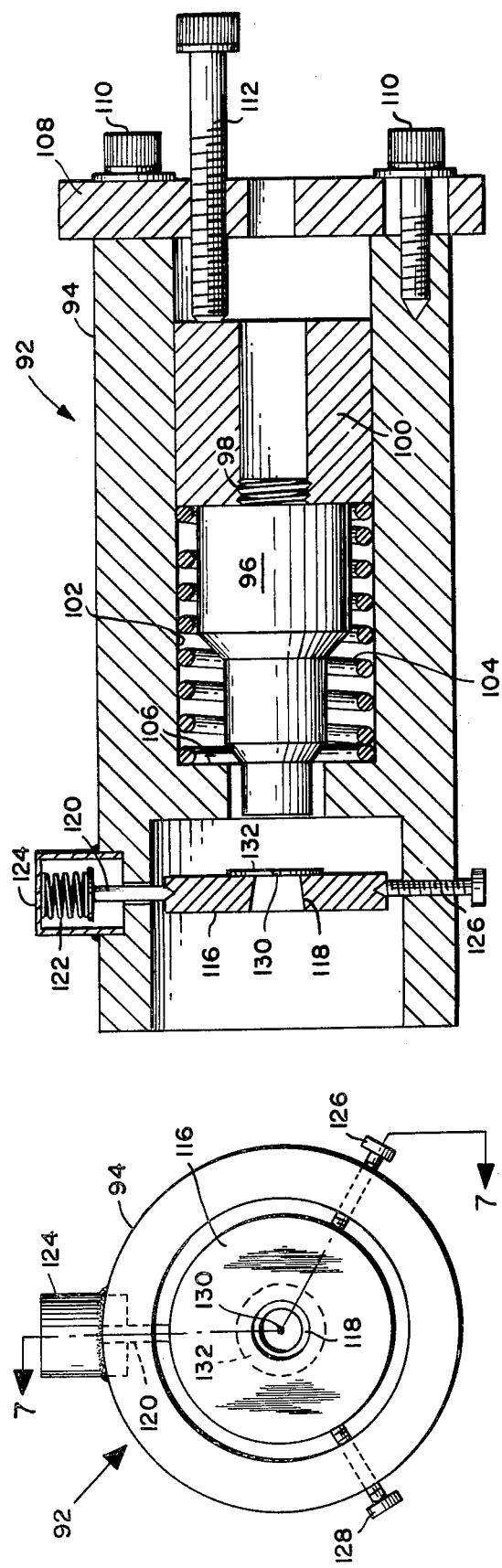
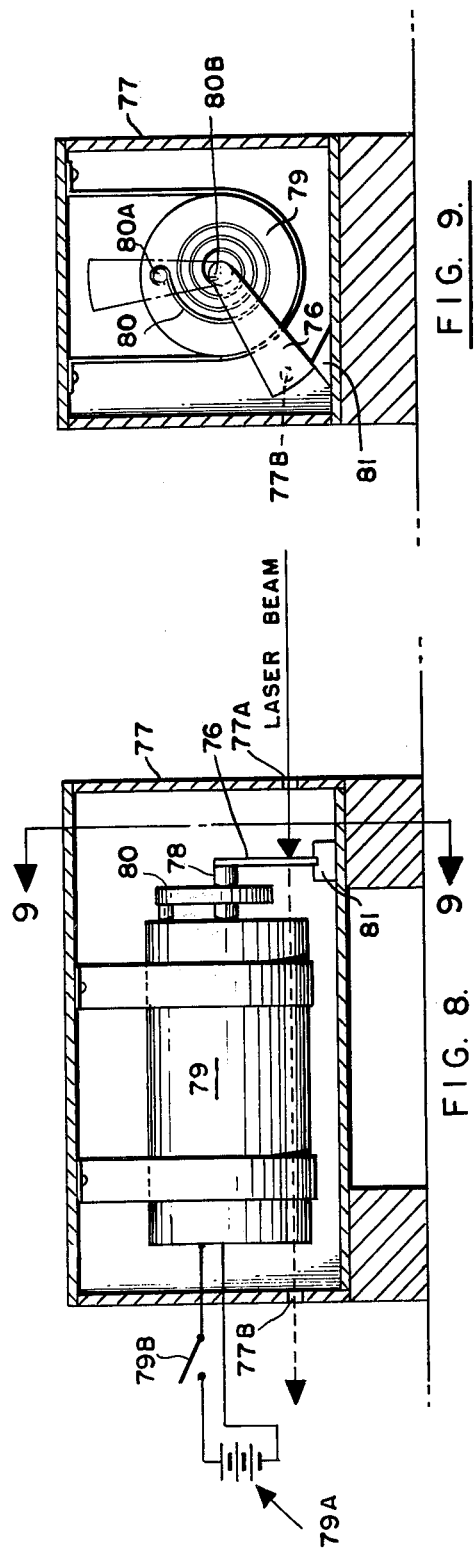

HOLOGRAM APPARATUS FOR TESTING WELDS

BACKGROUND OF THE INVENTION

It is known to use holographic non-destructive testing to compare the holographic image of the structure at one strain level with the holographic image from the same viewing angle at another strain level. Exemplary are U.S. Pat. Nos. 3,631,713; 3,644,047; 3,681,970; 3,976,380 and 3,897,995. All these patents employ a beam splitter to provide a reference beam with the exception of the last-mentioned patent in which laser light passes through a photographic plate and is reflected back from the surface being analyzed to provide the reference beam. Devices for reducing spatial frequency in a laser beam employing lenses and an aperture are also known to the art as seen from U.S. Pat. No. 3,532,407. The above-mentioned patents are incorporated herein by reference.

With the exception of U.S. Pat. No. 3,897,995, the apparatus of the above-discussed patents lacks flexibility for readily making holograms of different weld areas and of the same weld area from different angles. While the apparatus of U.S. Pat. No. 3,897,995 provides such flexibility to a considerable degree for an article having a flat surface, it is unsatisfactory for structures such as pipe since the ratio between the reference beam (pure light from the laser) and the object beam (reflected light from the film) varies drastically due to the fact that the roundness of the pipe places different portions of the surface being inspected at widely different distances from the photographic medium. The apparatus of this invention overcomes this problem. Further, this invention eliminates the necessity for adjustment between the laser and the photographic medium each time a hologram is to be made. Much of the vibration problem arising from the separate mounting of the laser mechanism and the structure being tested is eliminated by mounting the apparatus on the structure being tested. By eliminating beam splitting the great bulk of the laser beam can be used for the object being tested and a small amount for the reference beam, for example 10%.

BRIEF SUMMARY OF THE INVENTION

Hologram apparatus for testing for defects in welds has a frame with means for supporting the frame on the object to be tested. A laser beam is directed towards one end of the frame where it is reflected by a rotatable mirror onto an area of a weld lying in a predetermined direction somewhere within an arc of about 90° extending from a point directly below the mirror. A head is mounted for rotation on said one end of the frame coaxially with the mirror. A photosensitive recording medium is mounted on the head for receiving laser light reflected from the weld area. A reference beam mirror is mounted on the head for reflecting laser light from the rotatable mirror to the recording medium as a reference beam. The rotatable mirror and the head are interconnected to cause the ratio of the angular movement of the head to the angular movement of the rotatable mirror to be two to one.

BRIEF DESCRIPTION OF THE DRAWINGS

FIG. 1 is a plan view of a hologram apparatus in accordance with the invention;

FIG. 2 is a side elevation of the apparatus of FIG. 1;

FIG. 3 is a front elevation of the apparatus of FIG. 1;

FIG. 4 is a vertical section taken on the plane indicated by the line 4—4 in FIG 1;

FIG. 5 is a vertical section, partially broken away, taken on the plane indicated by the line 5—5 in FIG. 1;

FIG. 6 is an enlarged front elevation of the spacial frequency filter employed in the apparatus of FIG. 1;

FIG. 7 is a sectional view taken on the planes indicated by the lines 7—7 in FIG. 6;

FIG. 8 is a side elevation of the shutter of the apparatus of FIG. 1;

FIG. 9 is a view taken on the plane indicated by the line 9—9 in FIG. 8;

DETAILED DESCRIPTION

Figure 10:
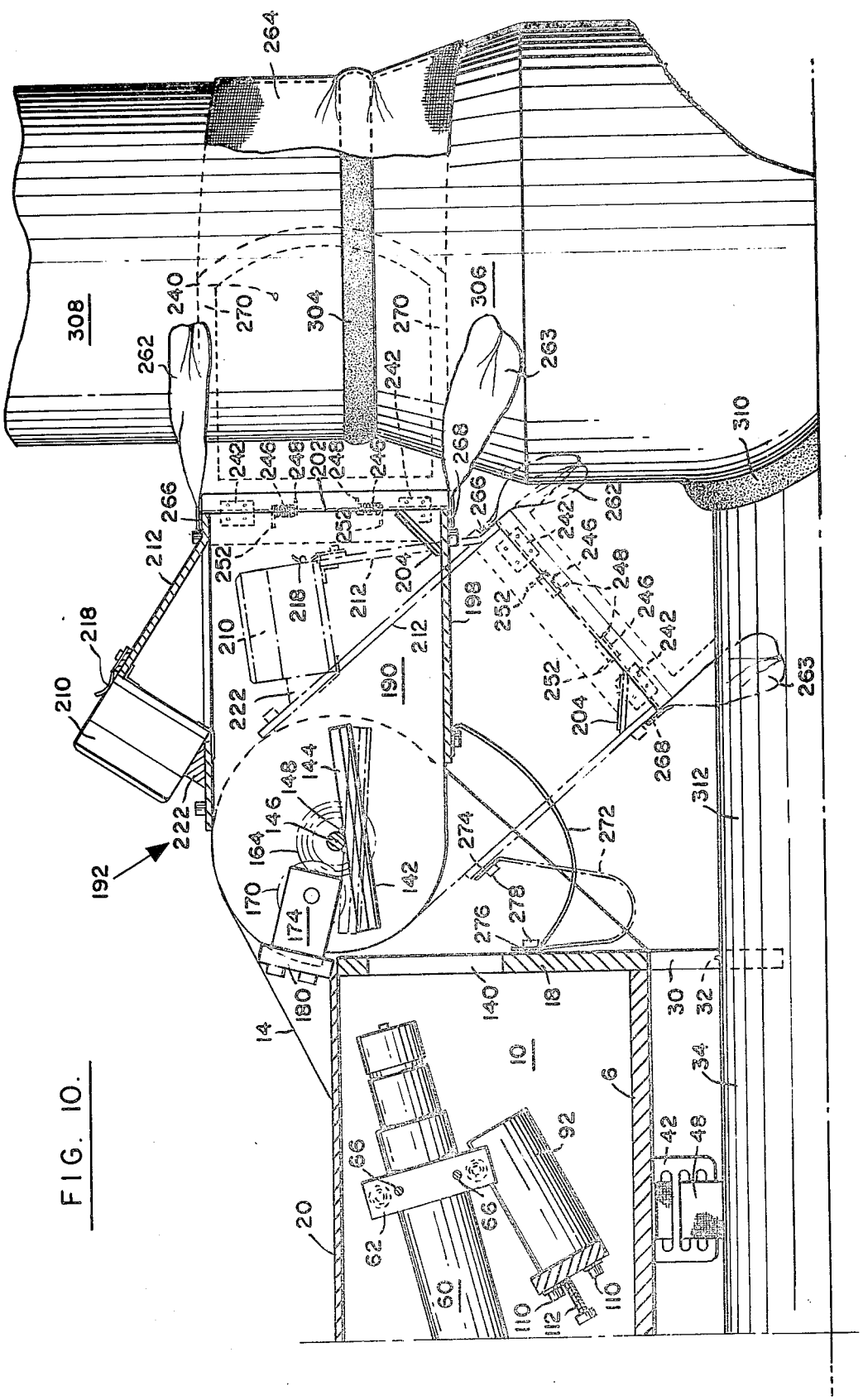
FIG. 10 is a vertical section taken on the plane indicated by the line 5—5 in FIG. 1 showing the head of the apparatus in different positions.
Figure 11:
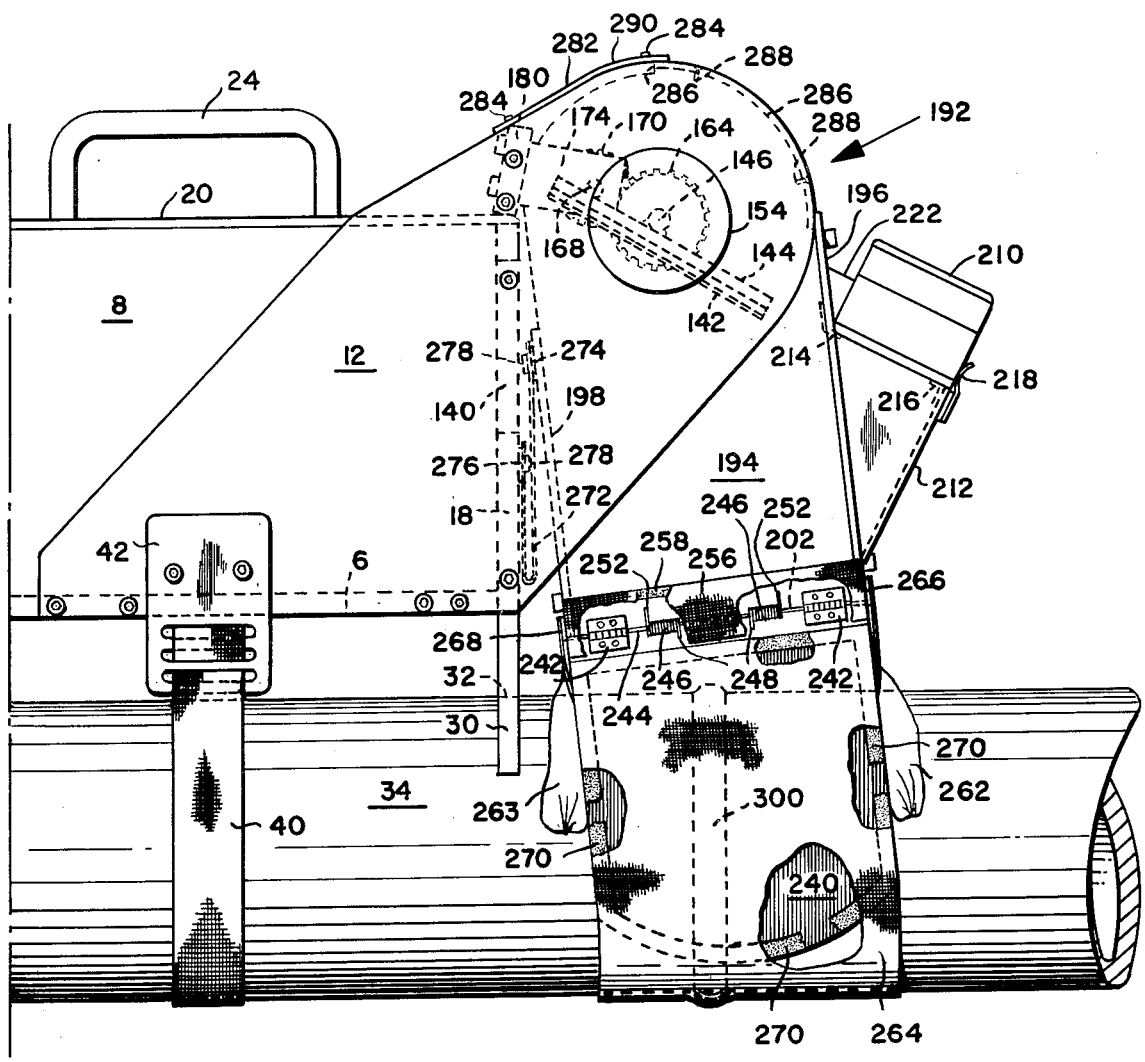
FIG. 11 is a side elevation, partially broken away, of the apparatus of FIG. 2.
Figure 12:
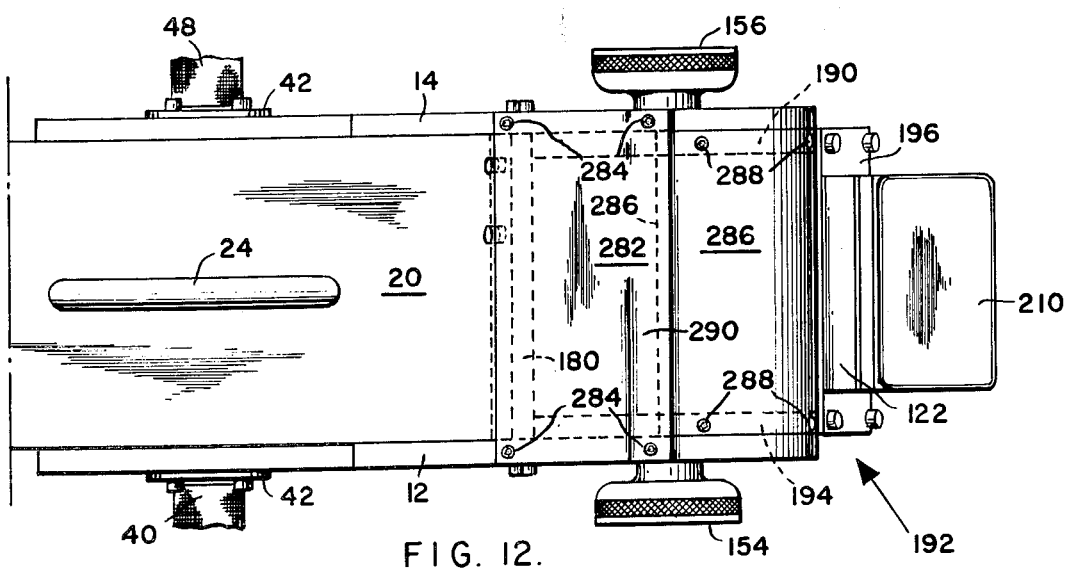
FIG. 12 is a plan view of the apparatus of FIG. 2 partially broken away.

Hologram apparatus 2 in accordance with the invention has a frame 4 with a bottom plate 6, side plates 8 and 10, head plates 12 and 14 which are secured respectively to side plates 8 and 10, a rear plate 16 and a front plate 18. A cover plate 20 is removably secured to frame 4 by machine screws 22 and has a handle 24 fixedly secured thereto for lifting the apparatus 2. Supports 28 and 30 are integral with plates 16 and 18 respectively and each have a V-shaped notch 32 for the reception of piping 34. Apparatus 2 is held to piping 34 by a strap 40 secured to a bracket 42 (FIG. 3) on head plate 12 and having a buckle 44 which is engaged by strap 48 which is secured to a second bracket 42 secured to head plate 14.

A laser 60 is secured to side plate 8 by clamps 62 and 64 which are each secured to side plate 8 by screws 66. Laser 60 may be, for example, any laser known to the prior art for holographic non-destructive testing such as a helium-neon laser, a YAG laser, a krypton laser, a $CO_2$ laser or a nitrogen laser. A continuous wave laser operating in the TEM mode should be used. Advantageously, the laser will have a power output in the milliwatt range with from about 1 to about 20 milliwatts being adaquate for most applications.

The beam from laser 60 is directed to a mirror 72 (FIG. 1) secured onto a metal block 74 into the center of which is threaded a bolt 75 to permit the rotation of block 74 on a vertical axis and securing it in a desired position by tightening the head of bolt 75 against bottom plate 6. Mirror 72 reflects the laser beam to a blade shutter 76 in a housing 77 (FIG. 8). Shutter 76 is mounted on a shaft 78 of an electrical rotary actuator 79 mounted in housing 77 which has openings 77A and 77B for the passage of the laser beam. Actuator 79 is connected to a source of power indicated at 79A through a switch 79B. When actuator 79 is deenergized, a coil spring 80, connected at one end at 80A to actuator 78 and at its other end at 80B to shaft 78, returns shutter 76 to the position shown in full lines in FIG. 9 against stop 81. After leaving opening 77B in housing 77, the laser beam passes to mirror 82 which is mounted on a plate 83 (FIG. 1) having a horizontal base portion 84 into which is threaded a bolt 86 to permit the rotation of plate 83 about the axis of bolt 86 and the securing of plate 83 by tightening the head of bolt 86 up against bottom plate 6. Mirror 82 is mounted on portion 88 of plate 83 which extends upwardly from base portion 84 at an acute angle to the horizontal. The rotation of plate 83 permits the raising and lowering of the beam leaving mirror 82 which is directed to pass through spatial frequency filter 92 which as seen in FIG. 7 has a housing 94 in which is mounted a conventional lens system 96 producing a divergent laser beam which is threadably secured at 9 to a cylindrical member 100 in a cavity 102 containing a compression coil spring 104 having one end abutting member 100 and biasing it to the right as viewed in FIG. 7 and the other end abutting wall 106 of cavity 102. A removable plate 108 is secured to housing 104 by screws 110 and has threadably secured thereto a screw 112 which bears against block 100 and may be used to adjust the position of block 100. A plate 116 having an aperture 118 is held in a conventional fashion by a headed pin 120 biased downwardly by a compression coil spring 122 in a housing 124 and by spaced screws 126 and 128 permitting the adjustment of the position of aperture 118 and more importantly of small aperture 130 in plate 132 secured to plate 116. Filter 92 need not be further detailed since such filters are well known to the art for removing undesired spatial frequency noise. Advantageously, the axis of lens system 96 is at an angle of from about 25° to about 65° to the horizontal. The filtered laser beam passes through an opening 140 in front plate 18 to a mirror 142 (FIG. 5) mounted on a plate 144 which is welded to a shaft 146 as indicated at 148. Shaft 146 is mounted for rotation in head plates 12 and 14 and has threaded ends 150 and 152 (FIG. 1) to which are attached identical knobs 154 and 156 respectively, each of which has a threaded bore 158. The tightening of knobs 154 and 156 against head plates 12 and 14 respectively prevents shaft 146 from rotating. A gear 164 is secured to shaft 146 and engages a gear 166 with half as many teeth to provide a two to one gear ratio. Gear 166 is secured to a shaft 168 to which a gear 170 is secured. Shaft 168 is mounted for free rotation in brackets 174 and 176 which are secured to a cross bar 180 attached to head plates 12 and 14. Cover 20 fits between cross bar 180 and plate 18. Gear 170 engages a gear 184 with an equal number of teeth to provide a one to one gear ratio. Gear 184 has a hub 186 which is welded to plate 190 (FIG. 1) of pivoting head 192 which also has a side plate 194, a front plate 196 (FIG. 5) and a rear plate 198. Plates 190 and 194 and gear 184 are mounted on shaft 146 so as to freely rotate with respect to shaft 146.

Pivoting head 192 has an open end 202 through which the laser beam is directed by mirror 142 onto the portion of the piping to be tested. A mirror 204 is secured to a plate 206 which is welded to plate 198 of head 192. Mirror 204 reflects a portion of the laser beam coming from mirror 142 to a film carrier 210 (see FIG. 5) mounted in a photographic pocket 212 in plate 196 and having film carrier support members 214 and 216. A clamp 218 clamps carrier 210 against a block 222 to hold the carrier in position. The film carrier 210 is conventional and will contain a film compatible with the selected laser. Other photosensitive media conventionally used to make holograms such as a photopolymers, photochromic glass can be used. Typically with a helium-neon laser Kodak 649 F or Agfa holotest film may be used.

To block exterior light, head 192 has secured thereto a pair of opposed plates 240 by hinges 242 having a common hinge pin 244. The plates are inwardly biased by coil springs 246 on hinge pin 244, each spring having one arm 248 engaging the plate and another arm 252 engaging head 192. A light tight fabric 256 overlies the gap between each plate 240 and the head 192 and is secured in place by an adhesive 258.

Looped pile cloths 262, 263 and 264 form a skirt to prevent light from passing between pipe 34 and plates 240 and into head 192. Cloth 262 is secured to a fabric strip 266 having hooks which is secured to head 192 by adhesive (not shown). Cloth 263 is secured to a fabric strip 268 having hooks which is secured to head 192 by adhesive (not shown). Cloth 264 is secured to a hook fabric strip 270 secured on each of plates 240 by adhesive (not shown). The hooks in strip 266, 268 and 270 engage and removably hold the looped pile cloths 262, 263 and 264 respectively. Such materials which removably adhere when pressed together are well known and available, for example, as Velcro. Plates 140 and cloths 262, 263 and 264 form a shroud to prevent the entry of light into the lower end of head 192.

A light tight flexible sheet 272 is secured to head 192 and plate 18 by strips 274 and 276, respectively, which are secured by screws 278. Sheet 272 extends between the head plates 12 and 14 to prevent exterior light from entering the upper end of head 192. As shown in FIG. 4, the unused portion 280 of cloth 264 drops free. The top of head 192 is closed by a plate 282 secured to head plates 12 and 14 by screws 284 and an arcuate plate 286 secured to plates 190 and 194 of head 192 by screws 288. Plate 282 has an arcuate portion 290 slidably engaged by arcuate plate 286 with the arcs of plate 286 and arcuate portion 290 having their centers on the axis of shaft 146.

OPERATION

In operation, supports 28 and 30 of apparatus 2 will normally be placed on piping, for example, the piping 34 with plates 240 embracing the piping. In order to make the apparatus secure on the piping 34, strap 40 will be passed underneath piping 34 and tightly secured to strap 48 through buckle 44 (see FIG. 3). Assuming that it is desired to inspect weld 300 in piping 34, weld 300 will lie below head 192 with the head being in the downwardly directed position. The cloths 262 and 263 hang downwardly about the pipe and cloth 264 is secured to one plate 270, passed under the pipe and then secured to the other plate 270. With the laser 60 energized, shutter 76 will be rotated out of its blocking position and spring 80 coiled by energizing actuator 79. A beam from laser 60 is directed to mirror 72 from which it is directed through shutter housing 77 to mirror 82 and thence through filter 92 through opening 140 and above plate 198 to mirror 142 which directs the beam downwardly part of which is reflected from mirror 204 to film in film carrier 210 as a reference beam and part of which is directed to the area of weld 300 from which it is reflected to film in film carrier 210. The exposure time will vary considerably depending upon the laser beam power and the sensitivity of the recording medium used but generally will be for a relatively short period of time in the range of from about 0.5 to about 10 seconds, after which actuator 79 is deenergized permitting spring 80 to return shutter 76 to the laser blocking position. Exposure time can be reduced by painting weld 300 with white spray paint. The piping in the area of weld 300 is then subjected to an applied stress in a conventional manner by heating, changing the pressure inside the piping or subjecting the piping to an external bending moment. Then shutter 76 is again opened to subject film in film carrier 210 to a second exposure of the laser beam reflected from the area of weld 300 and from mirror 204. Shutter 76 is then closed. The film is then ready for conventional development to form a double exposure hologram which may be illuminated by coherent light from the laser. Defects are observable in the interference patterns of the hologram.

As best seen in FIG. 10, head 192 can be pivoted to a wide variety of different positions through an angle of about 90°. As viewed in FIG. 10, head 192 is in a substantially horizontal position to permit the observation of a weld 304 connecting a branch fitting 306 to a branch pipe 308. As shown in broken lines, head 192 can be positioned to make a hologram of weld 310 connecting fitting 306 to main pipe 312. Head 192 is moved manually by moving it about shaft 146 with knobs 154 and 156 in the unscrewed position. The knobs are then tightened down to clamp head 192 in the desired position. Movement of head 192 through a given angle causes the train of gears 184, 170, 166 and 164 to move shaft 146 and hence mirror 142 through half the angle of movement of head 192 to keep the laser beam reflected from mirror 142 in the same relative position with respect to head 192. If cloth 263 is not supported by the piping, it can be secured to the strips 270 on the adjacent plate 240 before cloth 264 is wrapped around the piping to complete the shroud.

From the above description of the operation of the apparatus 2, it will be apparent that the apparatus 2 is highly advantageous as contrasted for example to ultrasonic systems and x-ray systems in view of its great flexibility in handling variable geometries of piping. It readily handles branch connection geometries which are often very difficult to x-ray due to acute angles and great variations of exposure density across the print which equally are difficult for ultrasonic systems since the echo is reflected internally with the wall of the structure to the point where flaw detection is impossible. The apparatus of this invention permits detecting cracks which can be observed only at an angle.

It will be understood that the above-described embodiment is illustrative and is not intended to be limiting.

I claim:
1. Hologram apparatus for testing for defects in welds comprising:
  a frame,
  means for directing a laser beam towards one end of the frame,
  a head having an open end mounted for rotation on said one end of the frame,
  a mirror mounted for rotation on the axis of rotation of the head for reflecting the laser beam towards the open end of the head,
  a photographic station including means for supporting a photosensitive medium on said head to receive the reflection of the laser beam passing through the open end of the head and striking the weld to be inspected,
  a mirror mounted on said head between the open end of the head and the first-mentioned mirror for reflecting a portion of the laser beam from the first-mentioned mirror to the photographic station as a reference beam, and
  means interconnecting the head and the first-mentioned mirror for causing the ratio of the angular movement of the head to the angular movement of the first-mentioned mirror to be 2 to 1.
2. Apparatus in accordance with claim 1 having means for supporting the apparatus on the object to be inspected.
3. Apparatus in accordance with claim 1 in which the head is rotatable through an angle of at least 90°.
4. Apparatus in accordance with claim 1 having a shutter controlling the laser beam between the laser and the first-mentioned mirror.
5. Apparatus in accordance with claim 1 in which the first-mentioned mirror is fixedly secured to a shaft mounted for rotation in the frame, the head is mounted for rotation on said shaft, and threaded members on the ends of the shaft removably clamp the shaft to the frame against rotation.
6. Apparatus in accordance with claim 5 having a gear secured to the head on its axis and a gear secured to the shaft and a train of gears connecting the first two-mentioned gears.
7. Apparatus in accordance with claim 1 having shroud means to prevent the passage of exterior light into the interior of the head between the head and the object to be inspected.
8. Apparatus in accordance with claim 7 in which the shroud means includes a pair of inwardly biased plates extending from the sides of the head and a skirt adapted to overlying the plates and the object to be inspected.

* * * * *